United States Patent [19]

Tandy et al.

[11] Patent Number: 4,868,000

[45] Date of Patent: Sep. 19, 1989

[54] MOUSSE PRODUCT

[75] Inventors: Karen G. Tandy, Litchfield; Rebecca S. So, New Milford, both of Conn.

[73] Assignee: Nestec S.A., Vevey, Switzerland

[21] Appl. No.: 239,138

[22] Filed: Aug. 31, 1988

[51] Int. Cl.$^4$ ................................................ A23G 9/02
[52] U.S. Cl. ..................................... 426/564; 426/565; 426/572; 426/561
[58] Field of Search ............... 426/564, 565, 572, 561, 426/591, 654, 74

[56] References Cited

U.S. PATENT DOCUMENTS

| | | | |
|---|---|---|---|
| 2,433,276 | 12/1947 | Hipple et al. ......................... | 426/565 |
| 3,535,122 | 10/1970 | Mussellwhite et al. ............... | 426/565 |
| 4,451,492 | 5/1984 | Dell et al. ............................ | 426/565 |
| 4,514,432 | 4/1985 | Grzinia ................................. | 426/564 |
| 4,587,130 | 5/1986 | Stauber ................................ | 426/565 |
| 4,663,176 | 5/1987 | Arden .................................. | 426/565 |
| 4,760,138 | 7/1988 | So et al. . | |

*Primary Examiner*—Jeanette Hunter
*Attorney, Agent, or Firm*—Vogt & O'Donnell

[57] ABSTRACT

A mixture of a dry carbonating complex of $Ca^{++}DCS$, sugar and flavoring provides an instant mousse mix for enabling preparation of a mousse dessert. The $Ca^{++}DCS$ is incorporated in the mix in an amount of from 5% to 45% by weight based upon the total weight of the mix. A mousse dessert may be prepared from the mix by adding heavy cream or milk to the mix. For mixes intended to be prepared with milk, a creamer or whipping agent is included as a further component of the mix.

17 Claims, No Drawings

MOUSSE PRODUCT

BACKGROUND OF THE INVENTION

The present invention relates to an instant mousse mix.

The basic ingredients of an instant mousse mix are sugar, flavourings, and a whipping agent. Acid is usually present in fruit flavoured mousse and, if desired, colourants may be added. In the preparation of an instant mousse, a quantity of the mousse mix is combined with either heavy cream or milk and whipped vigorously until the right firm texture for eating is obtained. The whipping agent may be gelatin or an emulsifier (which may be present in the creamer when a creamer is used as may be the case when the mousse is prepared from milk), or it may be a product capable of releasing or generating carbon dioxide readily on contact with water or acid.

In U.S. patent application Ser. No. 823,605, now U.S. Pat. No. 4,760,138, there is described a dry carbonating complex which is prepared by
(a) admixing a metal hydroxide, oxide or mixture thereof with an aqueous carbohydrate solution at a temperature of less than 25° C.;
(b) adding carbon dioxide to the solution for forming a reaction medium while maintaining the resulting reaction medium at a temperature of less than 25° C.; and then
(c) drying the reaction medium for obtaining a dry, stable complex (hereinafter referred to as DCS).

The metallic hydroxides or oxides may be those of the alkali or alkaline earth metals such as calcium, potassium, sodium, magnesium, barium, etc.

Although the dry carbonating complexes described in U.S. Pat. No. 4,760,138 are capable of releasing or generating carbon dioxide readily on contact with water or acid, we have found that most of them are totally unsuitable for use in instant mousses. In fact, surprisingly, only the complex prepared by using the hydroxide or oxide of calcium, hereinafter for the sake of brevity referred to as $Ca^{++}DCS$, is suitable since DCS prepared by using the hydroxide or oxide of other metals such as sodium or potassium does not provide the desired whipping properties, firm texture development and stability of the instant mousse products. This is even more surprising since other sources of calcium such as calcium carbonate or calcium chloride are unsuitable since they do not function to whip or stabilise the product as does DCS, and in addition, they contribute a salty off-flavour to the product.

SUMMARY OF THE INVENTION

The present invention provides an instant mousse mix comprising a mixture of sugar, flavouring and from 5% to 45% by weight of $Ca^{++}DCS$ based on the total weight of the mix.

The amount of sugar in the mix may be from 25% to 75% and more usually from 30% to 70% by weight based on the weight of the mix.

The flavours may be, for example, chocolate, mocha, vanilla, strawberry, lemon or pineapple ambrosia, and the flavour may be present in an amount according to the required taste. When the flavour is a fruit flavour, it is necessary to add acid, e.g. citric acid or malic acid to the mix.

For the preparation of the final mousse dessert for consumption, the instant mousse mix may be combined with either heavy cream or milk which may be whole or skimmed milk.

DESCRIPTION OF THE PREFERRED EMBODIMENTS

An instant mousse mix which is to be prepared into the dessert by combination with heavy cream preferably contains from 15% to 40% by weight of $Ca^{++}DCS$ based on the total weight of the mix. Conveniently the mix may be combined with from 3 to 6 times its own weight of heavy cream, acid mixes usually requiring more heavy cream. The ratio of acid to $Ca^{++}DCS$ in the mix is generally from 1:3 to 1:5, and preferably, the acid content is adjusted in conjunction with the $Ca^{++}DCS$ content to maintain the desired flavour.

An instant mousse which is to be prepared into the dessert by combination with milk requires the presence of a creamer or whipping agent to increase the amount of fat in the system and conveniently contains from 5% to 20% preferably from 6% to 16% by weight of $Ca^{++}DCS$ based on the total weight of the mix. In a system containing a neutral flavour such as chocolate, although creamers may function in the absence of $Ca^{++}DCS$, they do have disadvantages, e.g. a gelatin containing creamer may become rubbery and much too firm and impart a bitter flavour at the use levels required to give a firm mousse formation, while some fatty creamers need to be used at such high levels to produce a firm whipped mousse that the flavour and mouthfeel are objectionable. In the presence of $Ca^{++}DCS$, firm texture formation can be achieved using less creamer thus avoiding the objectionable flavour and mouthfeel. The amount of creamer used is preferably from 40% to 50% and more preferably from 42% to 46% by weight based on the weight of the mix. The amount of $Ca^{++}DCS$ used is preferably from 6% to 12% by weight based on the weight of the mix.

Fruit flavoured mousse mixes which are to be prepared into the dessert with milk require a creamer which is acid tolerant. The amount of creamer used is preferably from 45% to 55% by weight based on the weight of the mix. The amount of $Ca^{++}DCS$ is preferably from 8% to 16% by weight based on the weight of the dry mix. The ratio of acid to $Ca^{++}DCS$ in the mix is preferably from 1:2 to 1:4 and advantageously, the acid content is adjusted in conjunction with the $Ca^{++}DCS$ content to maintain the desired flavour.

A wide variety of non-dairy creamers are available on the market, and a suitable choice can readily be made by the person skilled in the art as to which creamers are compatible.

The advantages of the mousse mixes of the present invention include ease of preparation (hand mixing possible) and low manufacturing costs (simple ribbon blending and foil-poly pouch packaging). The mousse mixes which are to be prepared with heavy cream have instant whipping capabilities and are ready to serve within 15-45 seconds after the addition of cream, they have a long shelf-life of 18-24 months and, in addition, have a substantial calcium content. The mousse mixes which are prepared with milk have a lower preparation cost, contain less calories and provide a greater number of servings for a given quantity when compared with the mixes prepared from heavy cream.

EXAMPLES

The following Examples further illustrate the present invention. Parts and percentages are by weight unless otherwise stated.

EXAMPLE 1

An instant chocolate mousse mix for reconstitution with heavy cream was prepared by thoroughly mixing the following ingredients in the proportions given below:

|  | % | grams/packet |
|---|---|---|
| Sugar | 63.00 | 47.20 |
| $Ca^{++}$ Sucrose DCS | 18.10 | 13.70 |
| Cocoa Powder | 18.82 | 14.00 |
| Vanilla | 0.08 | 0.06 |
|  | 100.00 | 74.96 grams |

PREPARATION FOR CONSUMPTION

Combine 75.0 grams of mousse mix (one packet) with ½ pint (250 cubic cm) heavy cream (36–37½% milkfat). Mix vigorously with wire whisk for 40 seconds. Transfer thickened mousse to dessert dishes and serve (or refrigerate for later). One packet makes three 4-ounce servings of mousse.

EXAMPLE 2

An instant lemon mousse mix was prepared by thoroughly mixing the following ingredients in the proportions given below:

|  | % | grams/packet |
|---|---|---|
| Sugar | 52.508 | 25.200 |
| $Ca^{++}$ Sucrose DCS | 37.018 | 17.770 |
| Citric Acid | 10.000 | 4.800 |
| Natural Lemon Flavour | 0.460 | 0.224 |
| FD & C Yellow #5 | 0.014 | 0.006 |
|  | 100.000 | 48.000 grams |

PREPARATION FOR CONSUMPTION

Combine 48 grams of mousse mix with ½ pint, (250 cubic cm) heavy cream. Mix with spoon or whisk 15–20 seconds to produce a light fluffy mousse, ready to consume or refrigerate until ready to serve.

EXAMPLE 3

An instant pineapple ambrosia mousse mix was prepared by thoroughly mixing the following ingredients in the proportions given below:

|  | % | grams/packet |
|---|---|---|
| Sugar | 47.45 | 26.57 |
| $Ca^{++}$ Sucrose DCS | 23.72 | 13.28 |
| Sour Cream Powder | 10.18 | 5.70 |
| Yogurt Powder | 6.78 | 3.80 |
| Pineapple Juice Solids | 6.78 | 3.80 |
| Citric Acid Powder | 4.75 | 2.65 |
| Pineapple Flavour | 0.34 | 0.20 |
|  | 100.00 | 56.00 grams |

PREPARATION FOR CONSUMPTION

Combine 56 grams of mousse mix and ½ pint (250 cubic cm) heavy cream. Whip by hand using spoon or whisk to form stiff peaks.

Fold in the following ingredients for ambrosia:
16 ounce can pineapple chunks (drained)
11 ounce can mandarin orange slices (drained)
1 cup shredded coconut
1 cup miniature marshmallows
4 ounces chopped cherries
¼ cup chopped walnuts
Place in lined souffle dish.
Demold after several hours refrigeration.

EXAMPLE 4

An instant chocolate mousse mix for reconstitution with milk was prepared by mixing the following ingredients in the proportions given below:

|  | % | grams/packet |
|---|---|---|
| Sugar | 34.95 | 40.00 |
| Non-Dairy Creamers (42% fat) | 45.84 | 52.50 |
| Cocoa Powder | 12.75 | 14.60 |
| $Ca^{++}$ Sucrose DCS | 6.11 | 7.00 |
| Vanilla | 0.35 | 0.40 |
|  | 100.00 | 114.50 grams |

PREPARATION FOR CONSUMPTION

Combine 114.50 grams (one packet) mousse base with 1 cup (250 cubic cm) milk (whole or skim). Mix vigorously with wire whisk or electric mixer for two minutes. Transfer to dessert dishes and refrigerate 2 hours prior to serving.

Makes 5 to 6 4-ounce servings.

EXAMPLE 5

An instant strawberry mousse mix was prepared by thoroughly mixing the following ingredients in the proportions given below.

|  | % | grams/packer |
|---|---|---|
| Sugar | 37.022 | 39.82 |
| Non-Dairy Creamers (38% fat) | 50.204 | 54.00 |
| $Ca^{++}$ Sucrose DCS | 9.297 | 10.00 |
| Citric Acid Powder | 3.161 | 3.40 |
| Artificial Strawberry Flavour | 0.047 | 0.05 |
| Natural Strawberry Flavour | 0.232 | 0.25 |
| Red #40 | 0.037 | 0.04 |
|  | 100.000 | 107.56 grams |

PREPARATION FOR CONSUMPTION

Combine 107.56 grams of mousse base with 250 cubic cm milk (whole-skim) whip by hand or with electric mixer for 2 minutes until soft peaks form. Transfer to dessert dishes and refrigerate to create a firmer texture (one packet produces 6 4-ounce servings of mousse).

COMPARATIVE EXAMPLE A

By following a similar procedure to that described in Example 1 but using 18.10% of a complex prepared by using the hydroxide of sodium in the process of U.S. Pat. No. 4,760,138, instead of $CA^{++}DCS$, the instant mousse mix did not have the desired whipping properties, firm texture development or stability.

COMPARATIVE EXAMPLE B

By following a similar procedure to that described in Example 1 but using 18.10% of calcium carbonate instead of Ca++DCS, the instant mousse product did not have the desired whipping properties or stability and had a salty off-flavour.

COMPARATIVE EXAMPLE C

By following a similar procedure to that described in Example 1 but using, instead of Ca++DSC, an equivalent molar ratio of calcium carbonate, the instant mousse product was inferior to that of Example 1.

COMPARATIVE EXAMPLE D

By following a similar procedure to that described in Example 4 but omitting the Ca++DCS, the texture of the final mousse product was not as firm.

We claim:

1. An instant mousse dry mix for enabling preparation of a mousse dessert comprising sugar, flavoring and from 5% to 45% Ca++DCS by weight based upon the total weight of the mix.

2. A mousse mix according to claim 1 wherein the mix contains Ca++DCS in an amount of from 15% to 40% by weight based upon the total weight of the mix.

3. A mousse mix according to claim 1 wherein the mix contains Ca++DCS in an amount of from 5% to 20% by weight based upon the total weight of the mix and further comprising a component selected from a group consisting of a creamer and a whipping agent.

4. An instant mousse mix according to claim 1 or 2 further comprising an acid.

5. An instant mousse mix according to claim 4 wherein the acid is in an amount such that the ratio of acid to Ca++DCS is from 1:3 to 1:5.

6. An instant mousse mix according to claim 3 further comprising an acid and wherein when the further mix component is a creamer, the creamer is acid tolerant.

7. An instant mousse mix according to claim 6 wherein the acid is in an amount such that the ratio of acid to Ca++DCS is from 1:2 to 1:4 and wherein when the further mix component is a creamer, the a creamer is in an amount of from 40% to 55% by weight based upon the total weight of the mix.

8. An instant mousse mix according to claim 4 wherein the acid is selected from a group consisting of citric acid and malic acid.

9. An instant mousse mix according to claim 6 wherein the acid is selected from a group consisting of citric acid and malic acid.

10. A mousse dessert comprising a mixture of a mousse mix of sugar, flavoring and from 5% to 45% by weight of Ca++DCS based upon the total weight of the mix and comprising a substance selected from a group consisting of heavy cream and milk and wherein when the substance is milk, the mix further comprises a component selected from a group consisting of a creamer and a whipping agent.

11. A process for preparing a mousse dessert comprising adding and mixing a substance selected from a group consisting of heavy cream and milk with a mousse mix of sugar, flavoring and from 5% to 45% by weight of Ca++DCS based upon the total weight of the mix and wherein when the substance is milk, the mousse mix further comprises a component selected from a group consisting of a creamer and a whipping agent.

12. A process according to claim 11 wherein the mousse mix contains Ca++DCS in an amount of from 15% to 40% by weight based upon the total weight of the mix and heavy cream is added in an amount of from 3 to 6 times the weight of the mix.

13. A process according to claim 11 wherein the mousse mix contains Ca++DCS in an amount of from 5% to 20% by weight based upon the total mix weight of the mix, milk is added and wherein when the further mix component is a creamer, the creamer is in an amount of from 40% to 55% by weight of the total weight of the mix.

14. A process according to claim 11 or 12 wherein the mousse mix further comprises an acid in an amount such that the ratio of acid to Ca++DCS is from 1:3 to 1:5.

15. A mousse dessert according to claim 14 wherein the acid is selected from a group consisting of citric acid and malic acid.

16. A process according to claim 11 or 13 wherein the mousse mix further comprises an acid in an amount such that the ratio of acid to Ca++DCS is from 1:2 to 1:4 and wherein when the further mix component is a creamer, the creamer is acid tolerant.

17. A mousse dessert according to claim 16 wherein the acid is selected from a group consisting of citric acid and malic acid.

* * * * *